United States Patent [19]
Chabanne et al.

[11] Patent Number: 6,161,892
[45] Date of Patent: Dec. 19, 2000

[54] DETACHABLE, REVERSIBLE VEHICLE SEAT ADJUSTABLE LENGTHWISE BY CONTROLS ON ITS SLIDES

[75] Inventors: Jean-Pierre Chabanne, Champvallon; Jean Duchateau, Pont Salomon, both of France

[73] Assignee: Grupo-Antolin Ingenieria, Burgos, Spain

[21] Appl. No.: 09/365,021

[22] Filed: Aug. 2, 1999

[30] Foreign Application Priority Data

Sep. 11, 2000 [FR] France .................................. 98 10102

[51] Int. Cl.⁷ ...................................................... B60N 2/08
[52] U.S. Cl. .................................. 296/65.03; 296/65.01; 296/65.13; 296/65.15
[58] Field of Search ............................ 296/65.01, 65.03, 296/65.13, 65.15

[56] References Cited

U.S. PATENT DOCUMENTS

| | | |
|---|---|---|
| 4,277,043 | 7/1981 | Weik . |
| 5,636,884 | 6/1997 | Ladetto et al. .......................... 296/65.1 |
| 5,711,505 | 1/1998 | Nemoto ................................... 248/424 |
| 5,741,000 | 4/1998 | Goodbred ................................ 248/430 |
| 5,765,803 | 6/1998 | Graham ................................... 248/624 |
| 5,797,575 | 8/1998 | Clausen ................................... 248/429 |
| 5,911,465 | 6/1999 | Yamamoto et al. ................. 296/65.03 |
| 5,921,606 | 7/1999 | Moradell et al. .................... 296/65.03 |

FOREIGN PATENT DOCUMENTS

| | | |
|---|---|---|
| 0 615 879 A1 | 9/1994 | European Pat. Off. . |
| 2 700 735 | 7/1994 | France . |
| 197 29 581 A1 | 1/1998 | Germany . |
| 2 219 493 | 12/1989 | United Kingdom . |

*Primary Examiner*—D. Glenn Dayoan
*Assistant Examiner*—Mickki D. Murray
*Attorney, Agent, or Firm*—Oliff & Berridge, PLC

[57] ABSTRACT

A detachable, reversible vehicle seat adjustable lengthwise by controls on its slides, has a manual locking system for each of the slides, including a manual control handle articulated to one of the ends of each slide near the anchoring area of a leg of the seat, the ends being different on the two slides for a given seat, and a transverse connecting shaft articulated near the front legs below the base of the seat, one of whose ends is designed to cooperate with a manual control handle controlling the unlocking of one of the slides, while the other end of the transverse connecting shaft has a finger able to cooperate with the unlocking means of the other slide in its runner.

38 Claims, 7 Drawing Sheets

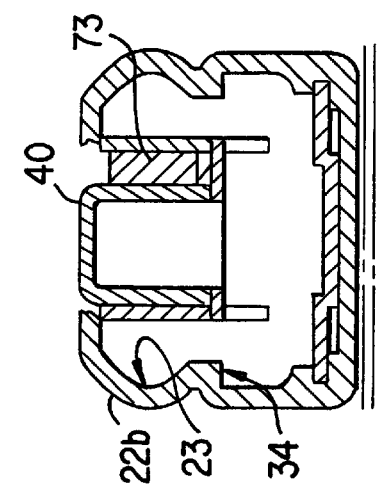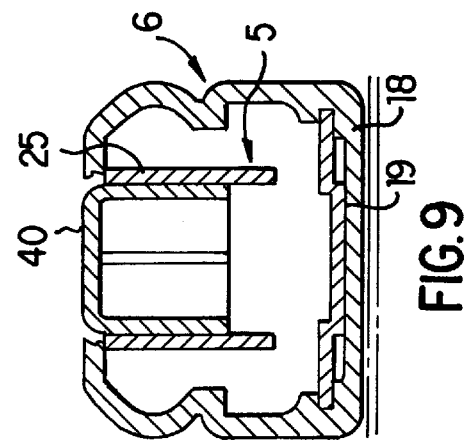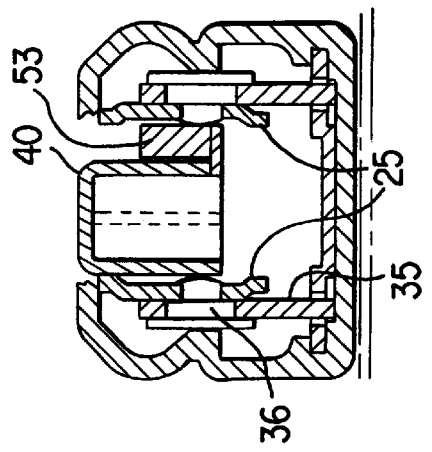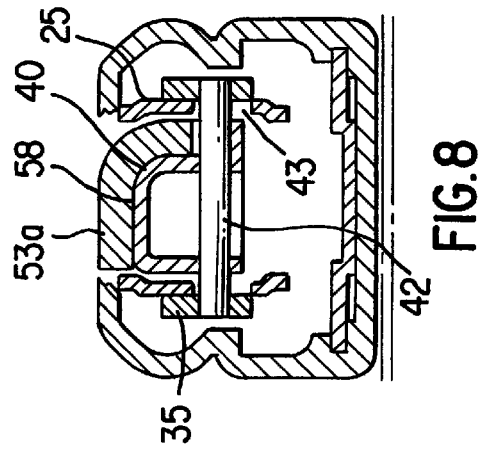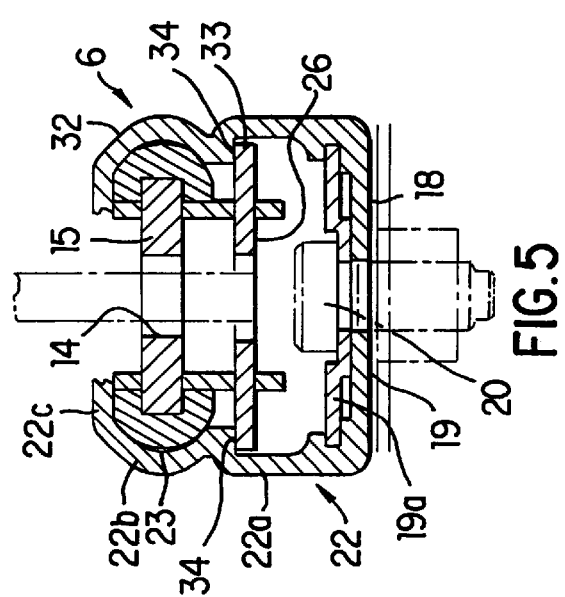

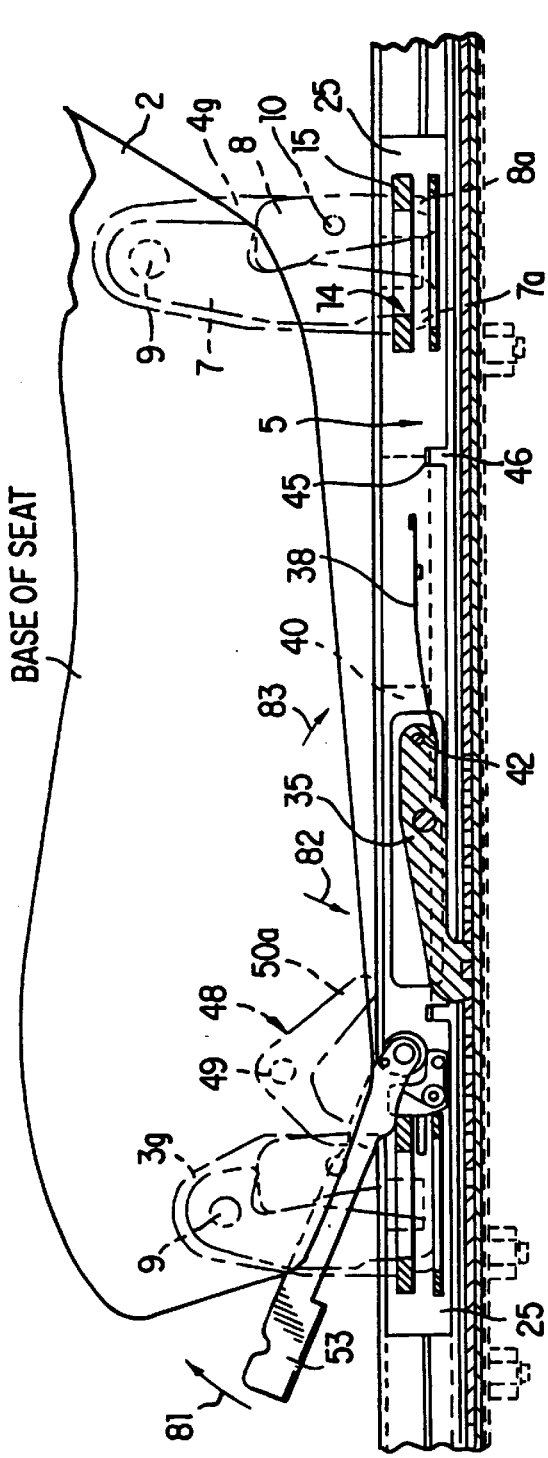
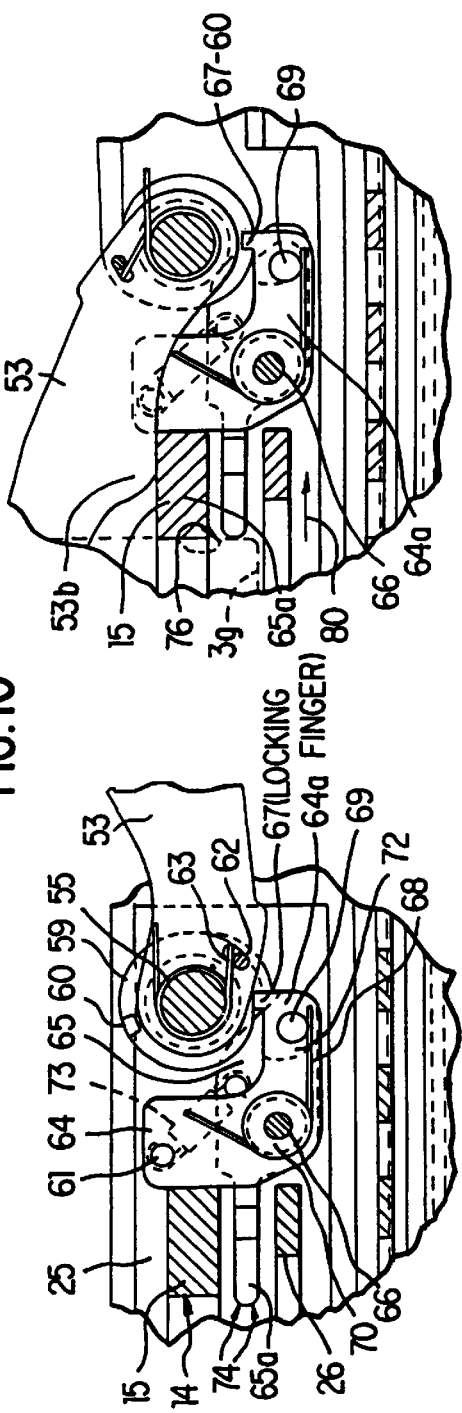

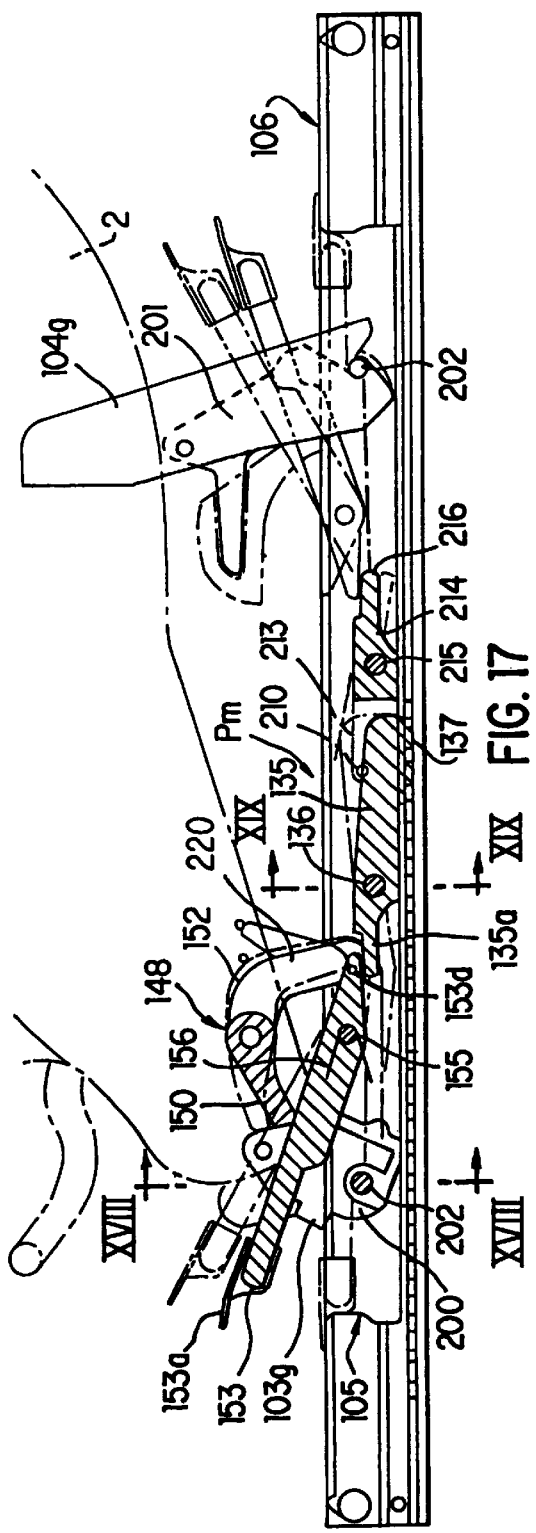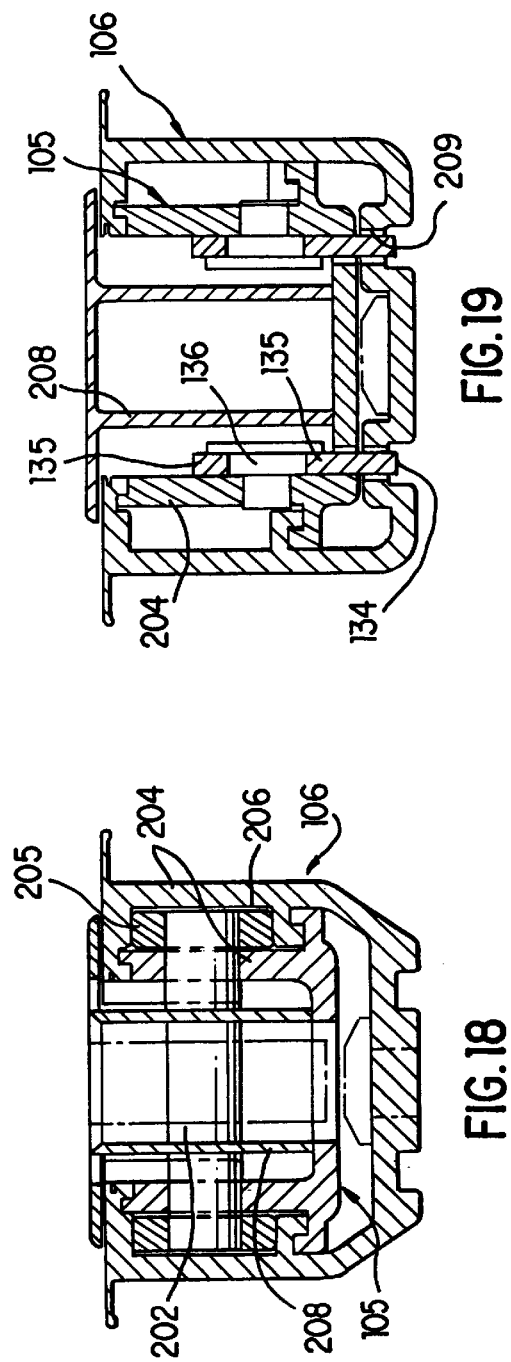

DETACHABLE, REVERSIBLE VEHICLE SEAT ADJUSTABLE LENGTHWISE BY CONTROLS ON ITS SLIDES

BACKGROUND OF THE INVENTION

1. Field of the Invention

The invention relates to a detachable, reversible seat. More particularly, this invention relates to a detachable, reversible seat that is adjustable lengthwise relative to two runners located on the floor of the vehicle.

2. Related Art

Detachable, reversible seats are used, for example, in vehicles whose passenger compartments can be converted to adapt to the number of people to be carried by adjusting the number of seats and/or the seat spacing, or to increase the luggage or cargo space by removing certain seats. This applies for example to van-type vehicles in which certain seats are reversible.

In particular, these seats have four legs each provided with latches that are spring-locked and manually unlocked, able to cooperate with matching anchoring means supported on slides movable lengthwise in the runners but equipped with locking means and manually unlockable.

French Patent 2,700,735 describes a detachable, reversible seat in which the means controlling the unlocking of the legs and of the slides are disposed below the base of the seat. This arrangement, which has all the control means for its finctions below the seat, has the disadvantage of making the seat heavier and increasing its cost, and, for an inattentive passenger, of making it easier to confuse the lengthwise adjustment control with the leg locking control, with the risk of releasing the seat from its runners as the vehicle is braking.

SUMMARY OF THE INVENTION

A goal of the present invention is to remedy these disadvantages by providing a seat in which the slide unlocking control is on the runners.

For this purpose, in the seat according to the invention, the manual unlocking apparatus of each of the slides comprise:

- a manual control handle articulated on one end of each slide, near the anchoring area of one leg, this end being different on the two slides of a given seat, and
- a transverse connecting shaft articulated near the front legs, under the base of the seat, one end of the shaft able to cooperate with the manual control handle unlocking one of the slides, while the other end of this latch has a finger able to cooperate with the manual unlocking apparatus that unlocks the other slide from its runner.

Thus, whether the seat is set up to face forward or to face the rear of the vehicle, the passenger always has an unlocking handle near one of the front legs of the seat, located outside the seat and, when operated, causing the unlocking of the two slides to function by the transverse connecting shaft supported by the seat.

The invention also provides retracting the handles when the runners are not in use to prevent the handles from projecting so that they could snag or be damaged or get in the way of loading the seat-free floor and, when a seat is set up, that brings only the desired handle to the utilization position.

These and other features and advantages of this invention are described in or are apparent from the following detailed description of various exemplary embodiments of the invention.

BRIEF DESCRIPTION OF THE DRAWINGS

Various exemplary embodiments of this invention will be described in detail, with reference to the following figures, wherein:

FIG. 10 is a lengthwise section of the runner when the seat is fully engaged, FIGS. 11, 12, and 13 are partial views on an enlarged scale showing the locking mechanism of the control handle, without the seat, when one seat leg is engaged, and with full engagement, respectively, FIG. 17 is a view in lengthwise section of another embodiment of the mechanism, FIGS. 18 and 19 are cross-sectional views on an enlarged scale along lines XVIII—XVIII and XIX—XIX in FIG. 17, respectively.

DETAILED DESCRIPTION OF EMBODIMENTS

Figure 1:
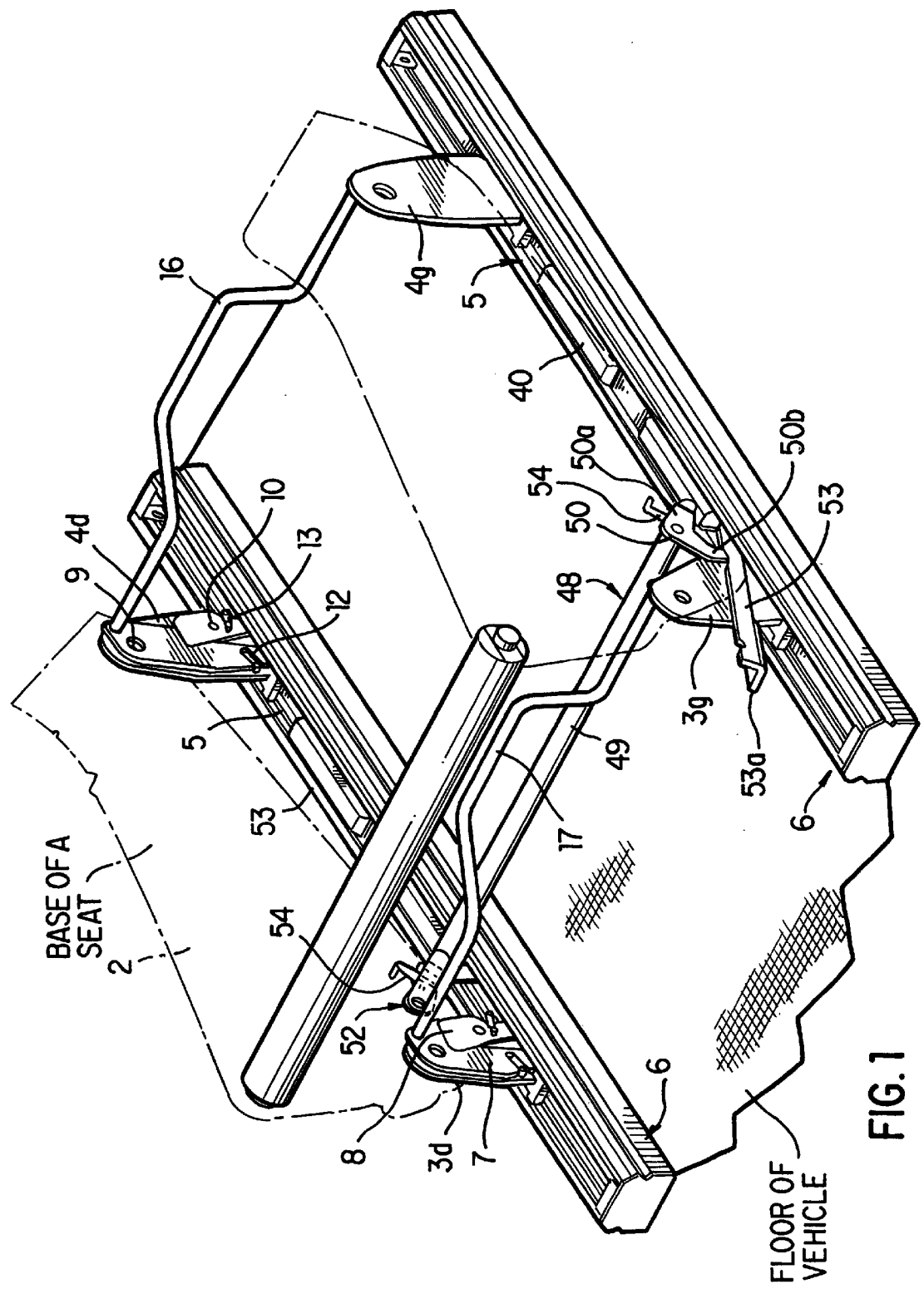
FIG. 1 is a partial perspective view of a first embodiment of the device for attaching the seat to the slides of two runners, when the seat is attached to the slides.

In one embodiment of the invention, each control handle is mounted rotatably freely on a transverse shaft of the slide. Each control handle is continuously urged by a torsion spring that tends to push that control handle against the central part of the slide and into the runner. Each control handle is connected rotatably, with the option of relative angular displacement over the unlocking control travel, to a toothed disk. A depression in which the toothed disk is able, when the handle has been manually repositioned, to cooperate with a locking finger, said finger being connected to means that are retractable when the seat is disengaged from the slide. In this case, the handle is repositioned manually once the seat has been set up and is automatically folded down.

In another embodiment, each control handle is mounted rotatably freely on a connecting shaft of the slide. Each control handle is continuously urged by a torsion spring that tends to push that control handle onto the end of the slide and into the runner as long as the front leg of the seat, coming into the anchoring area adjacent to the handle, has a lateral projection that, when the seat is fully engaged, can come to rest on the active end of the handle to bring this handle into the utilization position, with its free end projecting above the runner. The handle is replaced by the seat itself when the seat is set up. The handle likewise automatically folds down.

Other characteristics and advantages will emerge from the description that follows with reference to the attached schematic drawings showing two embodiments of the device according to the invention as examples.

In the drawings, a seat 2 has a base that is provided with two front legs 3d and 3g, and two rear legs 4d and 4g. Each leg 3d, 3g, 4d and 4g is associated with latches able to cooperate with corresponding anchoring devices supported on a slide 5. Each slide is displaceable in a corresponding runner 6.

In the embodiment shown in FIGS. 1 to 16, each leg 3d, 3g, 4d and 4g has two latches 7 and 8, articulated by first transverse shafts 9 and 10 on the corresponding leg and returned to the locking position by springs 12 and 13, which can be seen in FIG. 1.

As shown at the right of FIG. 10, these latches 7 and 8 are provided at their free ends with hooks 7a and 8a disposed back to back and able to catch under the edge of an opening 14 provided in a plate 15 supported by a slide 5. As shown in FIG. 1, in a known fashion, the latches 7 of the two rear legs 4d and 4g, and the latches 7 of the two front legs 3d and 3g, are each connected by rods 16 and 17, respectively, to control movement of the respective latches 7 and 8.

As shown in FIGS. 2 and 5 to 9, each runner 6 is formed by a metal shape, aluminum for example, which in cross section has the general shape of a U and has a flat, horizontal web 18 able to rest on the floor of a vehicle and able to receive on its interior surface a steel plate 19 having racks 19a. The runner 6 is connected to the floor by bolts 20 passing through its web 18 and steel plate 19, as shown in FIG. 5. Two wings 22 of the runner 6 have a straight part 22a and a rounded upper part 22b forming an internal groove 23 with a V-shaped cross section and a curved bottom. The rounded upper part 22b is extended by a return 22c, turned inward.

Figure 2:
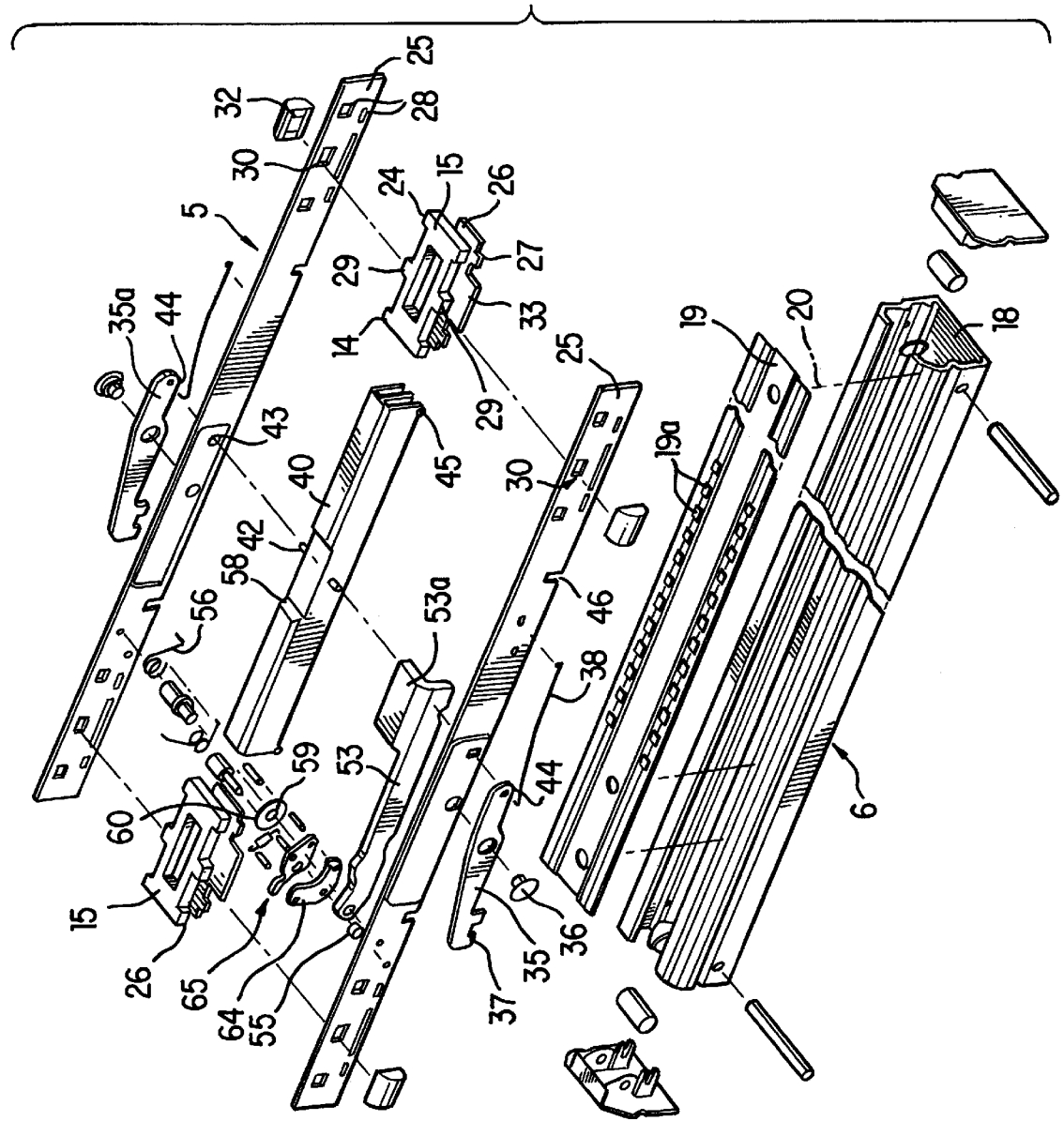
FIG. 2 is an exploded perspective view showing the various elements of the slide and the runner, when the seat is extracted from the vehicle, with the control handle in the retracted position.

As shown in FIG. 2, the slide 5 includes two lengthwise strips 25 connected to each other by the plates 15 and connecting parts 26. More specifically, each plate 15 and connecting part 26 have lugs 27 which, after passing through cutouts 28 provided in the corresponding strips 25, are riveted to these strips 25. Each plate 15 also has a side lug 29 in its central part on each side. Each lug 29, after passing through a cutout 30 in the corresponding strips 25, receives a slider 32. As shown in FIG. 5, each slider 32 has a semicircular cross section and is able to slide in the groove 23 of the runner 6. FIG. 5 also shows that connecting part 26 has two side lugs 33 that abut the runner 6 below shoulders 34 of the runner 6 to ensure that the slide 5 is prevented from making vertical movements relative to this runner 6.

The slide 5 includes two levers 35 that lock it into the runner 6. The levers 35 are disposed outside of the strips 25 of the slide 5. Each lever 35 is articulated on a cross pin 36 supported by the corresponding strip 25. Each lever 35 is provided at one of its ends with teeth 37 able to cooperate with the corresponding rack 19a. At its other end 35a, each lever 35 is urged by a return spring 38 that biases the teeth 37 to engage in the rack 19a.

These levers 35 are unlocked and relocked by an unlocking mechanism in the slide 5, a return mechanism positioned between the slides 5 and a manual control mechanism mounted in each of the slides 5.

In this embodiment, the manual control mechanism mounted in each slide 5 includes a rocker 40 disposed between the anchoring areas of the legs 3d, 3g, 4d and 4g. The rocker 40 has a second transverse shaft 42 positioned approximately halfway along the rocker 40. The second transverse shaft 42 is slidably mounted vertically in vertical oblong holes 43 formed in the strips 25. The ends of the second transverse shaft 42 extend beyond the strips 25 to penetrate bores 44 provided at the non-toothed ends 35a of the levers 35. At each of the free ends and on each side, the rocker 40 has a structure that limits its vertical movement, for example, projections 45. The projections 45 protrude laterally outward from the rocker 40 and slide vertically in notches 46 provided in the strips 25. The notches 46 terminate at the bottom of the strips 25. As shown in FIG. 1, each of rockers 40 of the slides 5 of the two runners 6 associated with a given seat 2 is operated simultaneously with the other rocker 40 by a connecting shaft 48 disposed transversely under the seat. In this embodiment, as shown in FIG. 1, the connecting shaft 48 includes a tubular shaft 49 mounted freely rotatably under the seat 2. One of the ends of the tubular shaft 49, for example, its left end, is provided with a bent lever 50, while the other end is integral with a control finger 52. The bent lever 50 has a leg 50a corresponding to the finger 52, and is able to rest on the corresponding end of the rocker 40 beneath it. Another leg 50b of the bent lever 50 is able to cooperate with a manual control handle 53. As shown in FIG. 1, tension springs 54 located on either runner between the seat frame and the leg 50a and the seat frame and the finger 52 respectively confer a return torque on the connecting shaft 48 that applies the leg 50b of the bent lever 50 against the handle 53.

Figure 3:
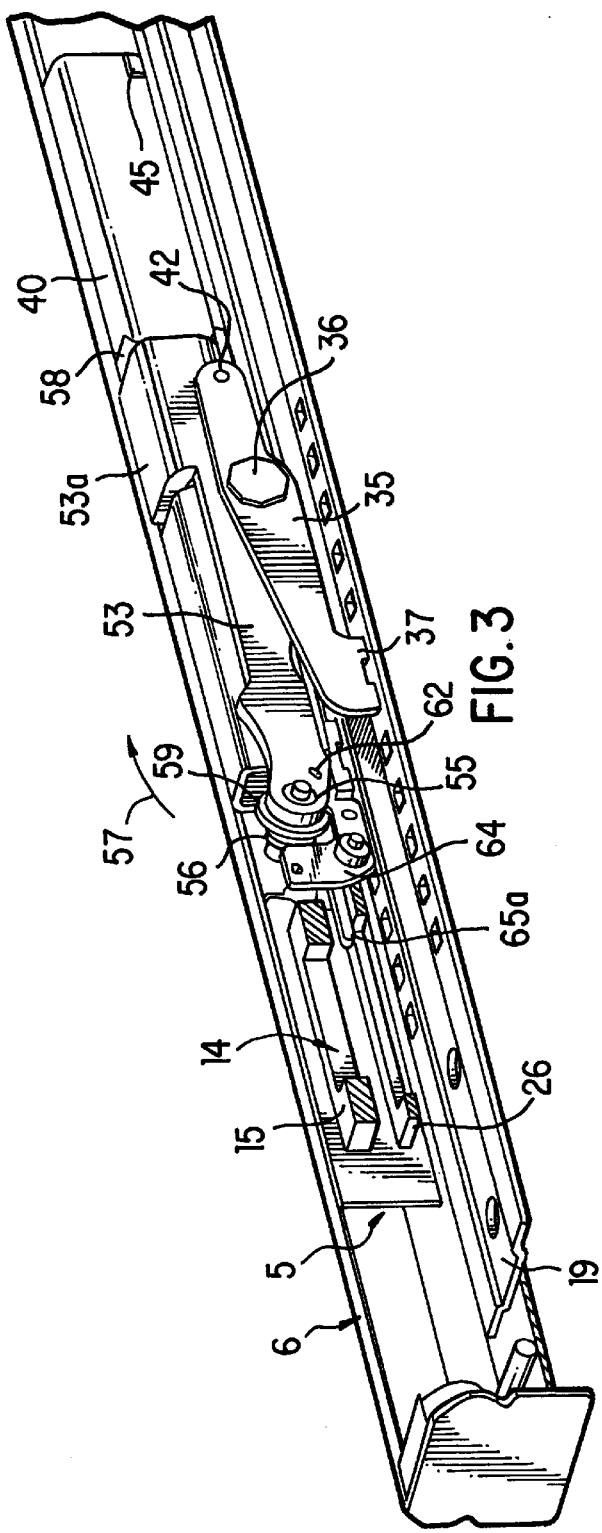
FIG. 3 is a partial perspective view in partial section showing the elements of FIG. 2 when assembled and in the locked position, when the seat is extracted from the vehicle with the control handle in the retracted position.
Figure 4:
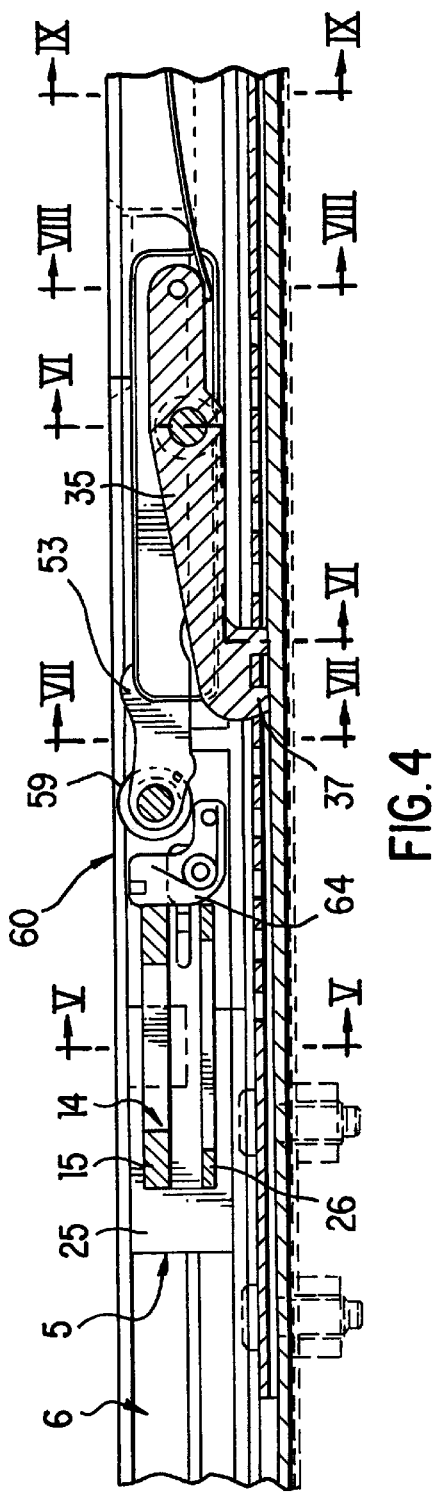
FIG. 4 is a partial view in lengthwise section of the mechanism in the position in FIG. 3, FIGS. 5 to 9 are cross-sectional views along lines V—V, VI—VI, VII—VII, VIII—VIII, and IX—IX in FIG. 4.

As shown in FIGS. 2 to 4, the handle 53 of each slide 5 is mounted freely rotatably on a shaft 55. In the slide 5 traveling in the runner 6 on the left, relative to a seat facing straight ahead, this shaft is on the front end of the slide 5, while on the slide traveling in the right-hand runner 6, this shaft is at the rear end of the slide 5.

The handle 53 is associated with a tension spring 56 which urges the handle 53 continuously in the direction of the arrow 57, tending to apply the handle 53 against the slide 5, in such a way that the gripping handle 53a is substantially in the central part of this slide 5, where the gripping handle 53a fits into a recess 58 in the rocker 40. The handle 53 is rotatably linked to a disk 59 having a depression 60. The disk 59 is mounted freely rotatably on the shaft 55 of the handle 53 but is linked rotatably to the handle 53 with the possibility of relative angular displacement limited between the disk 59 and the handle 53 by a transverse lug 62 projecting laterally from the handle 53 and penetrating an oblong circular hole 63 provided in this disk 59.

The locking mechanism that locks the handle 53 in the utilization position comprises a bent lever 64 and a control plate 65 disposed between the articulation of the control handle 53 and the anchoring area of the corresponding leg, namely the plate 15. As shown in greater detail in FIG. 11, the bent lever 64, which is articulated near its bend on a bent lever shaft 66, has, at the end of its substantially horizontal leg 64a, a locking finger 67 projecting upward and able to penetrate the depression 60 of the disk 59 under the influence of a torsion spring 68.

The horizontal leg 64a also has a transverse lug 69 projecting in the direction of the control plate 65. This control plate 65 is traversed by an opening 70 surrounding the bent lever shaft 66 and by an opening 72 surrounding the lug 69. Because of this, the control plate 65 can move relative to the bent lever 64, both rotationally and in transverse translation. A tension spring 73 is located between the plate 65 and securing means b1 of the substantially vertical leg of the lever 64. Finally, this control plate 65 has a detector finger 65a that extends below the anchoring plate 15 such that, in the absence of a seat leg, its end, provided with upper and lower bevels 74 on its edges, is below the opening 14 in the plate 15 and in the engagement trajectory of the corresponding seat leg 3d, 3g, 4d or 4g.

Finally, and according to another important feature of the invention, one of the seat legs 3d, 3g, 4d or 4g, in this case the front left leg 3g, has a groove 76 that can be seen in FIGS. 12 to 16, able to cooperate with the detector finger 65a.

Figure 13:
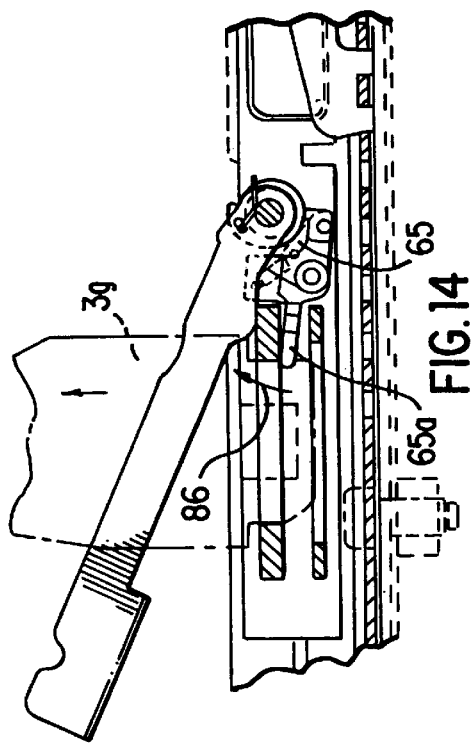

With this arrangement, in the absence of a seat 2, the two runners 6 do not provide an obstacle because, in each of them, the control handle 53 is in the folded-down position on the slide 5, and inside the runner 6, as shown in FIGS. 3, 4, and 8. Before mounting the seat 2 on the runners 6, the operator must bring the handle 53 cooperating with the front left leg 3g of the seat 2, namely the handle 53 of the left runner 6, into the utilization position if the seat 2 is to be placed in the normal position. Alternatively, the handle 53 of the right-hand runner 6 must be brought into the utilization position if the seat 2 is to be placed in the reversed position. This placement maneuver is done by causing the handle 53 to pivot in the reverse direction of the arrow 57 in FIG. 3, until the depression 60 of the disk 59 engages the locking finger 67. In this position, as shown for example in FIG. 12, a protuberance 53b of the handle 53 rests on the anchoring plate 15 and the handle 53 projects upward, while the handle 53 is beside the opening 14, provided in this plate 15. When the front legs 3d and 3g of the seat 2 are inserted into their anchoring plates 15, the lower edge of the left front leg 3g encounters the end of detector finger 65a and pushes the detector finger 65a back in the direction of arrow 80 in FIG. 12. As a result, the control plate 65 moves, assisted in this by the openings 70 and 72 that enable the control plate 65 to move relative to the second transverse shaft 66 and the lug 69, respectively. As shown in FIG. 13, as soon as groove 76 of the left front leg 3g reaches the end of the detector finger 65a, the end of the detector finger 65a penetrates into this groove 76 under the influence of the tension spring 73 and remains in this position as long as the seat 2 is on the runners 6.

When the seat 2 is in this position, as shown in FIG. 10, to adjust the seat position lengthwise relative to the runners 6, the handle 53 must be pivoted in the direction of the arrow 81. It will be noted that, because of the hole 63 provided in the disk 59, this pivoting has no effect on the toothed disk 59, which can thus continue to hold the handle 53 in the utilization position. Pivoting the handle 53 about connecting shaft 55 causes the lever 50 to pivot by means of the leg 50b of the lever 50, and by the connecting shaft 48, causes the finger 52, disposed on the other side of the seat 2, to pivot. As a result, the two rockers 40 are made to pivot in the direction of the arrow 82, relative to their projections 45 which, disposed at their other ends, rest on the bottoms of the notches 46 of the strips 25 of the slide 5. By means of the shaft 42, this rocking is transmitted to the two toothed levers 35 of each rocker 40. The levers 35 then pivot in the direction of the arrow 83 in FIG. 10, disengaging their teeth 37 from the corresponding racks 19a. After adjusting the lengthwise position of the seat 2, by slides the slides 5 in the runners 6, the operator releases the handle 53, which enables the springs 38 to bring the toothed levers 35 back into the slide 5-locking position and to return the rockers 40 to the resting position, with the springs 54 returning the connecting shaft 48 to its starting position.

It should be noted that, because of its position on one of the runners 6, the handle 53 which controls the lengthwise displacement cannot be confused with the rod 17 controlling the unlocking of the front legs 3d and 3g. Moreover, with this configuration, and except for the connecting shaft 48 which is very light and very simple, the seat 2 has no slide unlocking control mechanism and no control handle that could be damaged by handling the seat 2 outside the vehicle.

Figure 14:
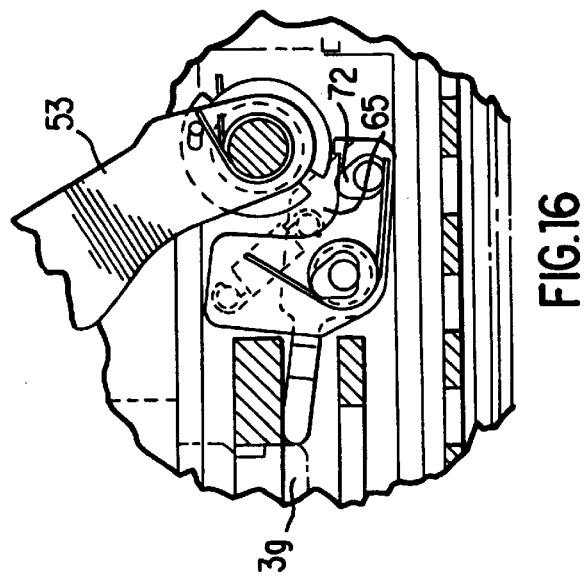
FIG. 14 is a partial view of the mechanism at the start of seat disengagement.
Figure 15:
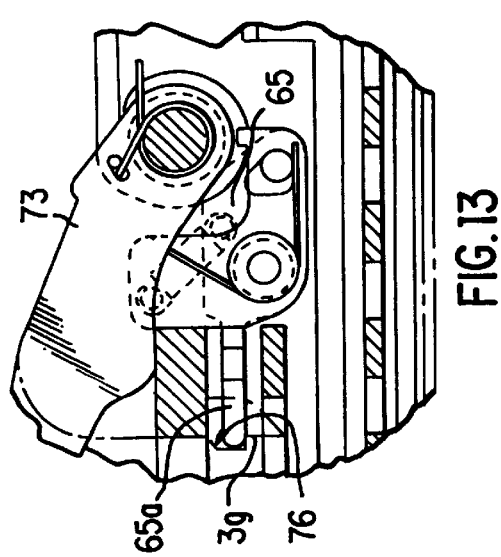
FIG. 15 is a partial view showing the mechanism of FIG. 14 on an enlarged scale.
Figure 16:
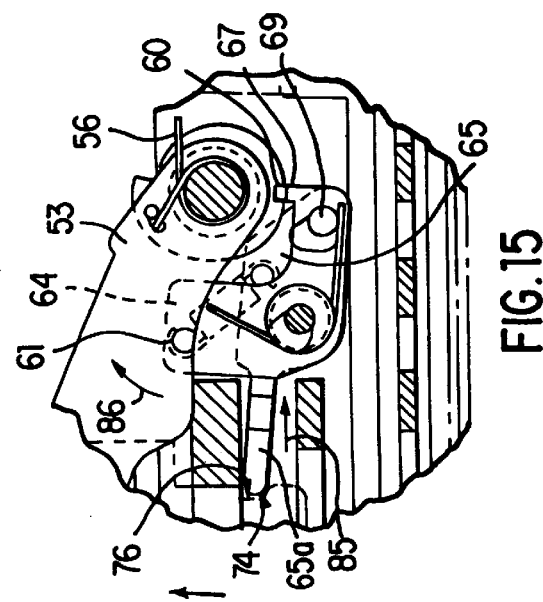
FIG. 16 is a partial view showing the following phase of seat disengagement on an enlarged scale.

When the seat 2 is extracted from the slides 5, as shown in FIGS. 14 and 15, disengagement of the front left leg 3g first causes the detector finger 65a to pivot upward (arrow 86). Next, and as soon as the lower edge of the groove 76 provided in the front left leg 3g encounters the lower bevel 74 of the detector finger 65a, it forces the detector finger 65a and the whole of the control plate 65 rearward in the direction of the arrow 85, as shown in FIG. 15. The rocking of the control plate 65 in the direction of the arrow 86 in turn impacts, by its lug 69, the bent lever 64, whose finger 67 disengages from the depression 60 of the disk 59 that is rotationally linked to the handle 53. As a result, as shown in FIG. 16, the handle 53 is freed and, under the influence of its torsion spring 56, can be folded down against the slide 5, as shown in FIGS. 3, 4 and 8, to rid the floor of the vehicle of any obstacles. FIG. 16 shows that the disengaging movement of the finger 67 does not affect the movements of the control plate 65 because of the openings 70 and 72 provided in the control plate 65.

It is obvious that, when the seat 2 is reversed, the handle 53 disposed on the rear end of the slide 5 positioned in the right-hand runner 6 folds down in the same way, because that handle 53 is locked by the same elements which react in the same manner to insertion and extraction of the front left leg 3g of the seat.

The embodiment shown in FIGS. 17 to 19 is distinguished from the previous embodiment by the leg locking mechanism, by the return mechanism that returns the control handles to the utilization position, and by the control mechanism of the toothed levers that lock the slides relative to the runners.

In the following description, parts that have different shapes but which fulfill the same functions as those of the first embodiment will have the same reference numerals plus 100, and the numbering of new parts will start at 200.

Front legs 103g and 103d, and rear legs 104d and 104g are equipped with latches 200 and 201, respectively, which straddle a another shaft 202 disposed in a well of the slide 105. This type of latch is well known and is described, for example, in U.S. Patent 4,700,989, which is incorporated herein by reference in its entirety. FIG. 18 shows that, under these conditions, each another shaft 202 passes through the wings 204 of the U-shaped body of slide 105. At each of its ends, this anchor shaft 202 has a roller 205 traveling in a lengthwise groove 206 defined by the inside surfaces 207 of the runner 106. The anchoring well 208 is made of synthetic material. FIG. 19 shows that each slide 105 has two toothed levers 135, articulated on pivots 136 and cooperating with a rack 209, created by perforating the bottom of the runner 106. FIG. 17, which shows the slide 105 of the left runner 106 in lengthwise section, shows that both of the levers 135 are oriented with their teeth 137 facing rearward and their non-toothed parts 135a below the active part 153d of the control handle 153. This control handle 153 is articulated on a shaft 155 and is constantly urged by a torsion spring 156 so that its grip 153a is folded down against the front end of the slide 105. The two toothed levers 135 are connected at their toothed parts by a third transverse shaft 210 which is essentially disposed in the transverse median plane Pm of the slide 105. This third transverse shaft 210 is straddled by a fork 213 of a matching lever 214 which is pivotably mounted on a pivot shaft 215 on the slide 105. The other end 216 of this lever 214 extends in the direction of the anchoring area of the rear leg 104g or 104d in order to form a point of application which is symmetrical to that formed by the non-toothed part 135a of lever 135 relative to the transverse median plane Pm of the slide 105. In the slide 105 of the right-hand runner, this end 216 of the matching lever 214 comes under the active end 153d of control handle 153, as shown in dot-dashed lines in FIG. 17.

In other words, the slide 105 traveling in the left-hand runner 106 has, listed from front to back, the anchor shaft 202 to anchor the front leg 103g, the shaft 155 for the articulation of the control handle 153, the pivots 136 for articulation of the toothed levers 135, the pivot shaft 215 for the matching lever 214, and the anchor shaft 202 for anchoring the rear leg 104g. In contrast, the slide 105 for the right-hand runner 106 has the anchor shaft 202 for anchoring the front leg 103d, the pivots 136, the anchor shaft 215 for the matching lever 214, the shaft 155 for the articulation of the handle 153, and the anchor shaft 202 anchoring the rear leg 104d.

The front part of the base of the seat 2 has a connecting shaft 148 whose left end is provided with a lever 150 able to cooperate with the control handle 153 and whose right end is provided with a finger 152 able to cooperate with the non-toothed portion 135a of the lever 135 of the other slide 105.

According to another characteristic of particular embodiments of the seat 2 according to the invention, the seat 2 has a lateral projection 220 projecting to the rear of its left front leg 103g. The lateral projection 220, when the seat 2 is engaged, abuts the active part 153d of the control handle 153 to cause the control handle 153 to pivot into the utilization position shown in FIG. 17.

Thus, when the seat 2 is in the normal position on the runners 106, its position is adjusted lengthwise by actuating the control handle 153 of the left runner 106. The control handle 153 acts directly on the non-toothed portion 135a of levers 135 of the left slide 105, and indirectly by the connecting shaft 148, on the toothed levers 135 of the right-hand slide 105. When the seat 2 is in the reversed position, actuation of the control handle 153 mounted on the right-hand slides 105 relative to the direction of travel, acts indirectly on the levers 135 disposed in the right-hand slide 105 by the matching lever 214. This movement is transmitted by the connecting shaft 148 to the matching lever 214 disposed in the left slide 105.

When the seat 2 is removed, the control handle 153 is freed from the projection 220 and returns automatically to its folded-down position under the influence of its return spring 156.

It emerges from the foregoing that, in particular embodiments of the seat 2 of this invention, as in the embodiments described in the drawings, the slide 105 unlocking mechanisms are actuated by the connecting shaft located under the seat by a control mechanism located on one of the slides, the control mechanism retracting after the seat has been extracted so that it does not project and impede vehicle loading or snag when the vehicle moves.

What is claimed is:

1. A detachable, reversible vehicle seat that is adjustable lengthwise by controls on runners, the seat comprising two front legs and two rear legs, each front and rear leg fitted with spring-loaded latches unlockable by manual control, the spring-loaded latches able to cooperate with a matching anchoring means mounted on two slides that can move in two parallel runners, each runner corresponding to one slide and attachable to the floor of a vehicle, each of the two slides provided with locking means including at least one manually unlockable toothed lever, the teeth of the toothed lever engageable by spring means with a rack of the runner, wherein the locking means of each of the slides comprises:

a manual control handle articulated on one end of each slide, near an anchoring area of one leg, the end being different on the two slides for a given seat; and a connecting shaft articulated near the front legs, extending transversely under a base of the seat, a first end of the connecting shaft able to cooperate with the manual control handle of one of the slides, and a second end the connecting shaft having a finger able to cooperate with the locking means that locks the other slide in the runner corresponding to the other slide.

2. The seat of claim 1, wherein each manual control handle is mounted rotatably freely on a first transverse shaft of one of the corresponding slides and is continuously urged by a torsion spring that biases that manual control handle towards a central part of the corresponding slide and into the corresponding runner.

3. The seat of claim 2, wherein each manual control handle is connected rotably to a toothed disk, when said manual control handle has been placed into a utilization position, wherein a depression of the toothed disk cooperates with a locking finger, said finger being connected to means that are retractable when the seat is disengaged from the slides.

4. The seat of claim 3, wherein the locking finger projects substantially perpendicularly from a first leg of a bent lever having a bend, the bent lever articulated near the bend on a bent lever shaft of the corresponding slide and urged by a spring into position for engaging the locking finger in the depression of the toothed disk, while a second leg of the bent lever is provided with a securing means for a first end of a tension spring, the bent lever positioned adjacent to a control plate mounted so that sliding and pivoting of the control plate are limited relative to the bent lever, the control plate having securing means for a second end of said tension spring and having, opposite the securing means, a detector finger forming a secant relative to a trajectory of engagement of a corresponding seat leg in the anchoring area of one of the slides.

5. The seat of claim 4, wherein the corresponding seat leg has a groove that, when engaged, is able to receive an end of the detector finger urged by the tension spring, and the groove, when disengaged, is able to cooperate with a bevel of the detector finger to force the detector finger against the tension spring and cause the detector finger to pivot, causing the bent lever to pivot in an unlocking direction of the manual control handle.

6. The seat of claim 3, wherein each toothed disk has an oblong hole and each manual control handle has a corresponding projection extending through the oblong hole, the oblong hole and projection cooperating to limit the relative angular displacement between the toothed disk and the corresponding manual control handle.

7. The seat of claim 2, wherein the first end of the connecting shaft mounted on the seat has a bent lever able to cooperate with one of the two manual control handles of the slides, a first leg of the bent lever able to contact the manual control handle and a second leg of the bent lever able to cooperate with an end of a control rocker unlockable from the corresponding slide, the control rocker connected approximately halfway along, and by a second transverse shaft, to a non-toothed end of the toothed lever, the control rocker having, at each end, means limiting an upward pivoting of that end, when another end of the control rocker is lowered by the second leg of the bent lever of the connecting shaft.

8. The seat of claim 1, wherein each manual control handle is mounted freely rotatably on a shaft of the corresponding slide and is continuously subject to an influence of a torsion spring that tends to push that manual control handle onto an end of the corresponding slide and into the corresponding runner.

9. The seat of claim 8, wherein a front leg of the seat entering the anchoring area adjacent to the manual control handle has a lateral projection which, when fully engaged, abuts an active end of the manual control handle to bring the manual control handle into an utilization position with a free end projecting above the corresponding runner.

10. The seat of claim 9, wherein the slide of a forward position type runner has, from front to back:
an anchoring shaft for a front leg of the seat,
an articulation of a manual control handle,
an articulation of a toothed, lever, a non-toothed end of the toothed lever below an active end of the manual control handle,
an articulation for a matching lever, a forked end of the matching lever straddling a transverse finger mounted on a toothed part of the toothed lever and another end of the matching lever positioned near a rear anchoring area and, when the seat is in a reversed position, able to contact a lever integral with the connecting shaft of the seat, and
an anchoring shaft for a rear leg of the seat.

11. The seat of claim 9, wherein the slide of reversed position-type runner comprises, from front to back:
an anchoring shaft of a front leg of the seat,
an articulation of a toothed lever, a non-toothed end of the toothed lever able, when the seat is in the forward position, to contact a lever integral with a connecting shaft,
an articulation for a matching lever, the free end of the matching lever below an active end of a manual control handle,
an articulation for the manual control handle, and
an anchoring shaft of a rear leg of the seat.

12. An unlocking apparatus for a detachable, reversible vehicle seat comprising at least two front legs and two rear legs mountable on at least two slides, each slide contained within a corresponding runner that is attachable to a floor of a vehicle, each runner having a rack, each slide movable within the corresponding runner relative to the rack and having a locking apparatus comprising at least one toothed lever, teeth of each toothed lever biasable into engagement with the rack of the runner to lock the slide into a particular relative position, the unlocking apparatus comprising:
at least two manual control handles, each manual control handle rotatably mounted on a first end of a corresponding one of the at least two slides, the first ends of two of the at least two slides positioned at opposite ends of the corresponding runners, and
a connecting shaft rotatably mounted near the front legs and under a base of the detachable, reversible vehicle seat, a first end of the connecting shaft able to cooperate with the manual control handle of a first one of the at least two slides, a second end of the connecting shaft having a finger able to cooperate with the locking apparatus of a second one of the at least two slides.

13. The unlocking apparatus of claim 12, wherein each manual control handle is freely rotatably mounted on a shaft of the corresponding slide and is biased against a central part of the corresponding slide and into the corresponding runner.

14. The unlocking apparatus of claim 13, further comprising a at least two toothed disks, each toothed disk having a depression and rotatably connected to a corresponding manual control handle, wherein, when the corresponding manual control handle is placed into a utilization position, a locking finger integral with a tubular portion of the connecting shaft is inserted into the depression of the toothed disk to lock that manual control handle into the utilization position.

15. The unlocking apparatus of claim 14, wherein each toothed disk has a hole and each manual control handle has a projection extending through the hole of the corresponding tooth disk, the holes and projections cooperating to allow limited relative angular displacement between the manual control handles and the corresponding toothed disks.

16. The unlocking apparatus of claim 14, further comprising at least two retracting structures, each locking finger connected to one of the at least two retracting structures, each retracting structure able to retract the connected locking finger from the corresponding depression to unlock the manual control handle from the utilization position when the detachable, reversible vehicle seat is dismounted from the at least two slides.

17. The unlocking apparatus of claim 16, wherein each retracting structure comprises a bent lever having a bend and rotatably mounted near the bend on a bent lever shaft of the corresponding slide, the locking finger projecting from the bent lever, the bent lever biasable by a first spring into an engagement position where the locking finger is inserted into the depression of the corresponding toothed disk.

18. The unlocking apparatus of claim 17, wherein each retracting structure comprises a control plate adjacent to the bent lever, the control plated mounted on the bent lever to allow limited sliding and pivoting of the control plate relative to the bent lever, the control plate having a detector finger extending into a leg mounting area of the corresponding slide.

19. The unlocking apparatus of claim 18, wherein one leg of the detachable, reversible vehicle seat has a groove, such that, when that leg is inserted into the leg mounting area of one of the at least two slides, the groove receives an end of the detector finger of that slide, and, when the detachable, reversible vehicle seat is dismounted from the at least two slides, the groove cooperates with the detector finger to force the control plate against the bent lever, the bent lever pivoting, in response, in an unlocking direction from the engagement position to disengage the locking finger from the depression, thus unlocking the manual control handle from the utilization position.

20. The unlocking apparatus of claim 12, wherein the locking apparatus of each slide further comprises a control rocker, each control rocker mounted on one of the at least two slides and having the toothed lever of that slide connected to that control rocker, wherein the connecting shaft mounted on the detachable, reversible vehicle seat has a bent lever at a first end of the connecting shaft, the bent lever able to cooperate with the manual control handle and the control rocker of a first one of the at least two slides, a first leg of the bent lever contactable by that manual control handle and a second leg of the bent lever engagable with the control rocker to disengage the toothed lever from the rack.

21. The unlocking apparatus of claim 12, wherein each manual control handle is freely rotatably mounted on a shaft of the corresponding slide and is biased to push that manual control handle onto an end of the corresponding slide and into the corresponding runner.

22. The unlocking apparatus of claim 21, wherein, when a first leg of the detachable, reversible vehicle seat is mounted on one of the at least two slides, a lateral projection of the first leg engages an active end of the manual control handle of that slide to bring the manual control handle into an utilization position where a free end of the manual control handle projects above the corresponding runner.

23. The unlocking apparatus of claim 22, wherein the at least two slides comprises a forward seat position slide and a reversed seat position slide, the forward seat position slide comprising, from front to back:

an anchoring shaft for a front leg of the detachable, reversible vehicle seat in at least one of the runners;

an articulation of the manual control handle of the forward seat position slide in at least one of the runners;

an articulation of the toothed lever of the forward seat position slide, a non-toothed end of the toothed lever positioned below the active end of the manual control handle in at least one of the runners;

an articulation for a matching lever, a forked end of the matching lever straddling a third transverse shaft mounted on a toothed part of the at least one toothed lever, a second end of the matching lever positioned near a rear anchoring well of the forward seat position slide, such that, when the detachable, reversible vehicle seat is in a reversed position, the second end is contactable by the finger of the connecting shaft in at least one of the runners; and an anchoring shaft for a rear leg of the detachable, reversible vehicle seat in at least one of the runners.

24. The unlocking apparatus of claim 22, wherein the at least two slides comprises a forward seat position slide and a reversed seat position slide, the reversed seat position slide comprising, from front to back:

an anchoring shaft for a front leg of the detachable, reversible vehicle seat in at least one of the runners;

an articulation of the toothed lever of the reversed seat position slide, wherein, when the detachable, reversible vehicle seat is in a forward position, a non-toothed end of the toothed lever is contactable by the finger of the connecting shaft in at least one of the runners;

an articulation for a matching lever, a forked end of the matching lever straddling a third transverse shaft mounted on a toothed part of the at least one toothed lever, a second end of the matching lever positioned near a rear anchoring well of the reversed seat position slide, such that, when the detachable, reversible vehicle seat is in a reversed position, the second end is contactable by the active end of the manual control handle of the reversed seat position slide in at least one of the runners;

an articulation for the manual control handle of the reversed seat position slide in at least one of the runners; and an anchoring shaft for a rear leg of the detachable, reversible vehicle seat in at least one of the runners.

25. A detachable, reversible vehicle seat for a vehicle having a at least two runners, each runner attached to a floor of the vehicle and containing a slide, each slide relatively movable within the corresponding runner and having a locking apparatus that locks that slide into a particular relative position along the runner, and a manual control handle mounted on an end of that slide, the detachable, reversible vehicle seat comprising:

at least two front legs and two rear legs mountable on the at least two slides; and a rotatable connecting shaft positioned near the front legs and under extending transversely a base of the detachable, reversible vehicle seat, a first end of the connecting shaft having a bent lever engagable with the manual control handle and locking apparatus of a first one of the at least two slides and a second end of the connecting shaft having a finger engagable with the locking apparatus of a second one of the at least two slides;

wherein, when the detachable, reversible vehicle seat is mounted on the at least two slides and the manual control handle of the first slide is moved to an unlocking position, the bent lever is engaged by that manual control handle and, in response, the bent lever engages the locking apparatus of the first slide and the finger engages the locking apparatus of the second slide to unlock the locking apparatus of the at least two slides to permit the relative position between the slides and the runners to be adjusted.

26. A vehicle comprising:

a detachable, reversible vehicle seat comprising at least two front legs and two rear legs;

at least two runners, each runner attached to a floor of the vehicle, each runner having a rack and containing a slide, the at least two front legs and two rear legs mounted on the slides of the at least two runners, each slide movable within the corresponding runner relative to the rack and having a locking apparatus comprising at least one toothed lever, teeth of each toothed lever biased into engagement with the rack of the runner to lock the slide into a particular relative position; and an unlocking apparatus that unlocks the locking apparatus of the at least two runners, the unlocking apparatus comprising at least two manual control handles, each manual control handle rotatably mounted on a first end of a corresponding one of the at least two slides, the first ends of two of the at least two slides positioned at opposite ends of the corresponding runners, and a connecting shaft rotatably mounted near the front legs and under a base of the detachable, reversible vehicle seat, a first end of the connecting shaft engagable with the manual control handle of a first one of the at least two slides, a second end of the connecting shaft having a finger engagable with the locking apparatus of a second one of the at least two slides.

27. The vehicle of claim 26, wherein each manual control handle is freely rotatably mounted on a shaft of the corresponding slide and is biased towards a central part of the corresponding slide and into the corresponding runner.

28. The vehicle of claim 27, the unlocking apparatus further comprising at least two toothed disks, each toothed disk having a depression and rotatably connected to a corresponding manual control handle, wherein, when the corresponding manual control handle is placed into a utilization position, a locking finger is inserted into the depression of the toothed disk to lock that manual control handle into the utilization position.

29. The vehicle of claim 28, wherein each toothed disk has a hole and each manual control handle has a projection extending through the hole of the corresponding tooth disk, the holes and projections cooperating to allow limited relative angular displacement between the manual control handles and the corresponding toothed disks.

30. The vehicle of claim 28, the unlocking apparatus further comprising at least two retracting structures, each locking finger connected to one of the at least two retracting structures, each retracting structure able to retract the connected locking finger from the corresponding depression to unlock the manual control handle from the utilization position when the detachable, reversible vehicle seat is dismounted from the at least two slides.

31. The vehicle of claim 30, wherein each retracting structure comprises a bent lever having a bend and rotatably mounted near the bend on a bent lever shaft of the corresponding slide, the locking finger projecting from the bent lever, the bent lever biasable by a first spring into an engagement position where the locking finger is inserted into the depression of the corresponding toothed disk.

32. The vehicle of claim 31, wherein each retracting structure comprises a control plate adjacent to the bent lever, the control plated mounted on the bent lever to allow limited sliding and pivoting of the control plate relative to the bent lever, the control plate having a detector finger extending into a leg mounting area of the corresponding slide.

33. The vehicle of claim 32, wherein one leg of the detachable, reversible vehicle seat has a groove, such that, when that leg is inserted into the leg mounting area of one of the at least two slides, the groove receives an end of the detector finger of that slide, and, when the detachable, reversible vehicle seat is dismounted from the at least two slides, the groove cooperates with the detector finger to force the control plate against the bent lever, the bent lever pivoting, in response, in a unlocking direction from the engagement position to disengage the locking finger from the depression, thus unlocking the manual control handle from the utilization position.

34. The vehicle of claim 26, wherein the locking apparatus of each slide further comprises a control rocker, each control rocker mounted on one of the at least two slides and having the toothed lever of that slide connected to that control rocker, wherein the connecting shaft mounted on the detachable, reversible vehicle seat has a bent lever at a first end of the connecting shaft, the bent lever able to cooperate with the manual control handle and the control rocker of a first one of the at least two slides, a first leg of the bent lever contactable by that manual control handle and a second leg of the bent lever engagable with the control rocker to disengage the toothed lever from the rack.

35. The vehicle of claim 26, wherein each manual control handle is freely rotatably mounted on a shaft of the corresponding slide and is biased to push that manual control handle onto an end of the corresponding slide and into the corresponding runner.

36. The vehicle of claim 35, wherein, when a first leg of the detachable, reversible vehicle seat is mounted on one of the pairs of slides, a lateral projection of the first leg engages an active end of the manual control handle of that slide to bring the manual control handle into an utilization position where a free end of the manual control handle projects above the corresponding runner.

37. The vehicle of claim 36, wherein the at least two slides comprises a forward seat position slide and a reversed seat position slide, the forward seat position slide comprising, from front to back:

an anchoring shaft for a front leg of the detachable, reversible vehicle seat in at least one of the runners;

an articulation of the manual control handle of the forward seat position slide in at least one of the runners;

an articulation of the toothed lever of the forward seat position slide, a non-toothed end of the toothed lever positioned below the active end of the manual control handle in at least one of the runners;

an articulation for a matching lever, a forked end of the matching lever straddling a third transverse shaft mounted on a toothed part of the at least one toothed lever, a second end of the matching lever positioned near a rear anchoring well of the forward seat position slide, such that, when the detachable, reversible vehicle seat is in a reversed position, the second end is contactable by the finger of the connecting shaft in at least one of the runners; and an anchoring shaft for a rear leg of the detachable, reversible vehicle seat in at least one of the runners.

38. The vehicle of claim 36, wherein the at least two slides comprises a forward seat position slide and a reversed seat position slide, the reversed seat position slide comprising, from front to back:

an anchoring shaft for a front leg of the detachable, reversible vehicle seat in at least one of the runners;

an articulation of the toothed lever of the reversed seat position slide, wherein, when the detachable, reversible vehicle seat is in a forward position, a non-toothed end of the toothed lever is contactable by the finger of the connecting shaft in at least one of the runners;

an articulation for a matching lever, a forked end of the matching lever straddling a third transverse shaft mounted on a toothed part of the at least one toothed lever, a second end of the matching lever positioned near a rear anchoring well of the reversed seat position slide, such that, when the detachable, reversible vehicle seat is in a reversed position, the second end is contactable by the active end of the manual control handle of the reversed seat position slide in at least one of the runners;

an articulation for the manual control handle of the reversed seat position slide in at least one of the runners; and an anchoring shaft for a rear leg of the detachable, reversible vehicle seat in at least one of the runners.

* * * * *